United States Patent
Megchiani et al.

(10) Patent No.: US 11,551,484 B2
(45) Date of Patent: Jan. 10, 2023

(54) VAPOR CYCLE MACHINE MANAGEMENT SYSTEM

(71) Applicant: The Boeing Company, Chicago, IL (US)

(72) Inventors: Chetan B. Megchiani, Bothell, WA (US); Jared D. Mulholland, Lake Stevens, WA (US); Kevin Cheng, Seattle, WA (US); Hamid Reza Nikjou, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 425 days.

(21) Appl. No.: 16/785,366

(22) Filed: Feb. 7, 2020

(65) Prior Publication Data

US 2021/0248840 A1  Aug. 12, 2021

(51) Int. Cl.
*G07C 5/00* (2006.01)
*B60H 1/00* (2006.01)
*B64D 13/08* (2006.01)
*B64D 13/06* (2006.01)
*B64D 45/00* (2006.01)

(52) U.S. Cl.
CPC ......... *G07C 5/006* (2013.01); *B60H 1/00585* (2013.01); *B64D 13/08* (2013.01); *B64D 2013/0651* (2013.01); *B64D 2045/0085* (2013.01)

(58) Field of Classification Search
None
See application file for complete search history.

(56) References Cited

U.S. PATENT DOCUMENTS

| | | |
|---|---|---|
| 8,365,514 B1 | 2/2013 | Kupratis |
| 2013/0327729 A1 | 12/2013 | Apostolides et al. |
| 2016/0230659 A1 | 8/2016 | Gu et al. |
| 2018/0031290 A1 * | 2/2018 | Ho .................. F25B 43/003 |
| 2020/0331636 A1 | 10/2020 | Mulholland et al. |

FOREIGN PATENT DOCUMENTS

WO    WO-2015124889 A1 *  8/2015  ............. B64D 13/08

OTHER PUBLICATIONS

Office Action, dated May 23, 2022, regarding U.S. Appl. No. 16/693,183, 13 pages.

* cited by examiner

*Primary Examiner* — Tamara L Weber
(74) *Attorney, Agent, or Firm* — Yee & Associates, P.C.

(57) ABSTRACT

A method, apparatus, system, and computer program product for managing a vapor cycle machine. Data is received for the vapor cycle machine in an aircraft. The data comprises a pressure, a temperature, and a speed for a set of compressors in the vapor cycle machine. A ratio of the pressure to the temperature is determined for the set of compressors that ran during a flight of the aircraft. A set of actions is performed when the ratio of the pressure to the temperature for the set of compressors that ran during the flight of the aircraft exceeds a threshold more than a selected number of times over a range of flights for the aircraft.

29 Claims, 8 Drawing Sheets

VAPOR CYCLE MACHINE MANAGEMENT SYSTEM

BACKGROUND INFORMATION

1. Field

The present disclosure relates generally to aircraft and, in particular, to maintaining aircraft systems. Still more particularly, the present disclosure relates to a method, apparatus, and system for predicting when a vapor cycle machine may no longer perform within specifications for the vapor cycle machine.

2. Background

In aircraft, a vapor cycle machine is a part of the forward cargo air-conditioning (FCAC) system that provides a temperature-controlled environment in a cargo compartment of the aircraft. The vapor cycle machine is a cooling source for air routed into the cargo compartment, and aids in conditioning and maintaining the temperature of the cargo compartment at a desired level. As a result, temperature-sensitive cargo such as live animals, perishables, and pharmaceuticals can be transported in this cargo compartment.

The vapor cycle machine may encounter issues that require maintenance or replacement of the vapor cycle machine. Performing maintenance for replacement at a desired time can be challenging depending on the ability to determine when such maintenance or replacement is needed.

Therefore, it would be desirable to nave a method and apparatus that take into account at least some of the issues discussed above, as well as other possible issues. For example, it would be desirable to have a method and apparatus that overcome a technical problem with maintaining a vapor cycle machine in an aircraft.

SUMMARY

An embodiment of the present disclosure provides a method for managing a vapor cycle machine. Data is received for the vapor cycle machine in an aircraft. The data comprises a pressure, a temperature, and a speed for a set of compressors in the vapor cycle machine. A ratio of the pressure to the temperature is determined for the set of compressors that ran during a flight of the aircraft. A set of actions is performed when the ratio of the pressure to the temperature for the set of compressors that ran during the flight of the aircraft exceeds a threshold more than a selected number of times over a range of flights for the aircraft.

Another embodiment of the present disclosure provides a vapor cycle machine management system comprising a computer system and a system manager in the computer system. The system manager operates to receive data for a vapor cycle machine in an aircraft, wherein the data comprises a pressure, a temperature, and a speed for a set of compressors in the vapor cycle machine. The system manager operates to determine a ratio of the pressure to the temperature for the set of compressors that ran during a flight of the aircraft. The system manager operates to perform a set of actions when the ratio of the pressure to the temperature for the set of compressors that ran during the flight of the aircraft exceeds a threshold more than a selected number of times over a range of flights for the aircraft.

Yet another embodiment of the present disclosure provides a vapor cycle machine management system comprising a computer system and a system manager in the computer system. The system manager operates to receive data for a vapor cycle machine including a pressure, a temperature, and a speed for a set of compressors in the vapor cycle machine in a vehicle. The system manager operates to determine which of the set of compressors ran during a last use of the vehicle. The system manager operates to determine a ratio of the pressure to the temperature for the set of compressors that ran during the last use of the vehicle. The system manager operates to perform a set of actions when the ratio of the pressure to the temperature for the set of compressors that ran during the last use of the vehicle that exceeds a threshold more than a selected number of times over a range of uses for the vehicle.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
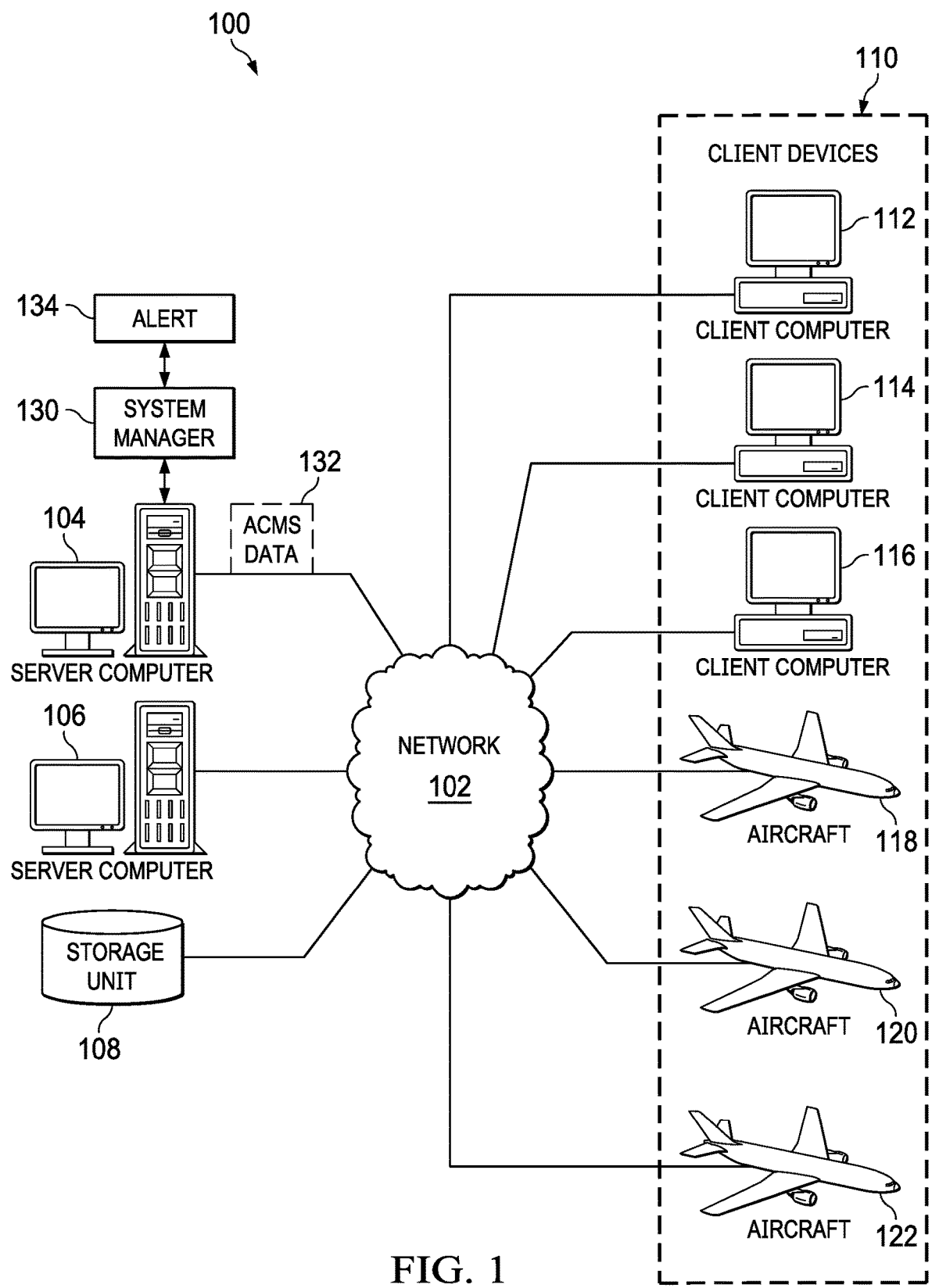
FIG. 1 is a pictorial representation of a network of data processing systems in which illustrative embodiments may be implemented.

The illustrative embodiments recognize and take into account one or more different considerations. For example, the illustrative embodiments recognize and take into account that it is desirable to perform maintenance on an aircraft system prior to the aircraft system registering a nonconformance mode and potentially requiring a delay or cancellation of a flight. The illustrative embodiments also recognize and take into account that a higher-than-desired failure rate of cargo vapor cycle machines in aircraft can impose an economic burden on the airline and its operations.

The illustrative embodiments also recognize and take into account that it is desirable to perform maintenance on an aircraft system in a manner that reduces the amount of maintenance but also in a manner that avoids a nonconformance of the aircraft system. The illustrative embodiments also recognize and take into account that it is desirable to reduce repair costs for an aircraft system by early failure detection. The illustrative embodiments recognize and take into account that providing advance notification of an impending failure prior to a hard failure of a unit would aid in reducing maintenance burden, dispatch interruption, and increase system availability.

Thus, the illustrative embodiments provide a method, apparatus, system, and computer program product for at least one of detecting or predicting when a cargo vapor cycle machine is in a state that is degrading. Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In one illustrative example, a method manages a vapor cycle machine. The vapor cycle machine can be a cargo vapor cycle machine in an aircraft or some other vehicle or other platform. The process can receive data for the vapor cycle machine in an aircraft. The data comprises a pressure, a temperature, and a speed for compressors in the vapor cycle machine. The process also can determine a ratio of pressure to temperature for the compressors that ran during a flight of the aircraft. The process can perform a set of actions when the ratio of the pressure to the temperature for the compressors that ran during the flight of the aircraft exceed a threshold more than a selected number of times over a range of flights for the aircraft.

As used herein, a "set of," when used with reference to items, means one or more items. For example, a "set of actions" is one or more actions.

The set of actions can include generating an alert that indicates a clogged filter is present and that maintenance is needed for the vapor cycle machine. With the alert, the maintenance can be scheduled for the vapor cycle machine. The alert can be generated to provide sufficient lead time to locate parts and schedule the maintenance in a manner that can reduce unavailability of an aircraft, reducing at least one of delays, cancellations, or economic impact. The amount of lead time can be, for example, 120 days.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as aircraft 118, aircraft 120, and aircraft 122. In this illustrative example, server computer 104, server computer 106, storage unit 108, and client devices 110 are network devices that connect to network 102 in which network 102 is the communications media for these network devices. Some or all of client devices 110 may form an Internet-of-Things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

In the illustrative example, aircraft 118, aircraft 120, and aircraft 122 include vapor cycle machines for providing cooling in a cargo component in the aircraft. A vapor cycle machine typically comprises at set of compressors, a condenser, an expansion device, an evaporator. These components are connected by a conduit. A refrigerant circulates in a closed loop through these components in changes states to provide cooling.

As depicted, these aircraft can send airplane condition monitoring system (ACMS) data 132 to system manager 130 in server computer 104. This data can be generated by currently available monitoring systems, such as aircraft condition monitoring systems (ACMSs).

In some illustrative examples, system manager 202 can be located in aircraft 118, aircraft 120, and aircraft 122 and analyze send airplane condition monitoring system data 132 onboard the aircraft. In yet other examples, system manager 130 can be distributed between server computer 104 and server computer 106 to provide load-balancing. In still other illustrative examples, system manager 130 can be distributed between server computer 104 and in computer systems in aircraft 118, aircraft 120, and aircraft 122.

An aircraft condition monitoring system is a hardware system in an aircraft that monitors sensor parameters in the aircraft. This system can collect sensor data from sensors for different aircraft systems in the aircraft during different phases of flight such as during takeoff and cruise phases of flight.

Airplane condition monitoring system (ACMS) data 132 can be received from aircraft condition monitoring systems in aircraft 118, aircraft 120, and aircraft 122 at different times. For example, airplane condition monitoring system data 132 can be received during at least one of after the flight of the aircraft or during the flight of the aircraft.

In this illustrative example, airplane condition monitoring system data 132 is analyzed by system manager 130 on a per-flight basis for each of the aircraft.

In other words, system manager 130 can place airplane condition monitoring system data 132 from the different aircraft into groups based on flights of the aircraft. In other illustrative examples, airplane condition monitoring system data 132 can be grouped based on some number of flights such as every two flights, every five flights, or some other number of flights of the aircraft.

System manager 130 can analyze the pressure, temperature, and speed for compressors in the vapor cycle machines in each of the aircraft. In this illustrative example, system manager 130 can determine a ratio of pressure to temperature of the compressors that ran during the flight of the aircraft. If the compressors did not run during the flight, the ratio is not calculated for that flight. The ratio is compared to a threshold. Generating alert 134 is an action that can be performed by system manager 130 if the ratio exceeds the threshold amount more than some number of times over a range of flights for the aircraft.

If alert 134 is generated for one of aircraft 118, aircraft 120, or aircraft 122, maintenance can be scheduled for the aircraft for which alert 134 has been generated. This maintenance can be scheduled by system manager 130 or some other suitable process.

Thus, the alert can indicate that a vapor cycle machine in an aircraft for which the alert is generated is in a degrading state. The alert can be generated to provide sufficient time to schedule maintenance for the aircraft in a manner that reduces impact on availability of the aircraft for use in aircraft operations.

Figure 2:
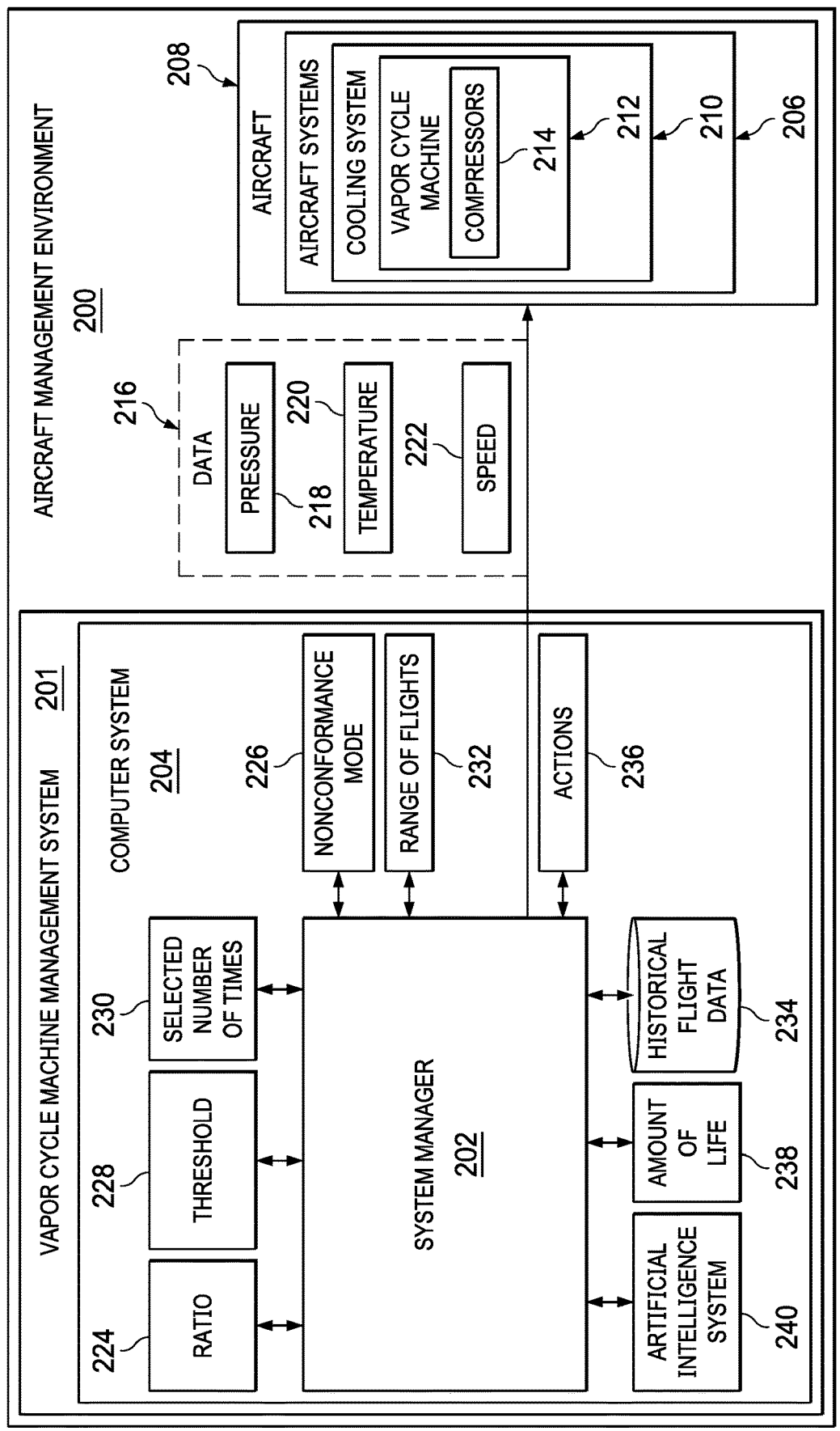
FIG. 2 is an illustration of a block diagram of an aircraft management environment in accordance with an illustrative embodiment.

With reference now to FIG. 2, an illustration of a block diagram of an aircraft management environment is depicted in accordance with an illustrative embodiment. In this illustrative example, aircraft management environment 200 includes components that can be implemented in hardware such as the hardware shown in network data processing system 100 in FIG. 1.

In this illustrative example, aircraft management environment 200 includes vapor cycle machine management system 201. In this example, vapor cycle machine management system 201 comprises system manager 202 and computer system 204. System manager 202 is located in computer system 204. As depicted, system manager 202 operates to manage maintenance for aircraft systems 206 in aircraft 208.

System manager 202 can be implemented in software, hardware, firmware, or a combination thereof. When software is used, the operations performed by system manager 202 can be implemented in program code configured to run on hardware, such as a processor unit. When firmware is used, the operations performed by system manager 202 can be implemented in program code and data and stored in persistent memory to run on a processor unit. When hardware is employed, the hardware can include circuits that operate to perform the operations in system manager 202.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 204 is a physical hardware system and includes one or more data processing systems. When more than one data processing system is present in computer system 204, those data processing systems are in communication with each other using a communications medium. The communications medium can be a network. The data processing systems can be selected from at least one of a computer, a server computer, a tablet computer, or some other suitable data processing system. Computer system 204 can be located in at least one of aircraft 208, a ground location, or some other suitable location.

In this illustrative example, aircraft systems 206 include cooling system 210. Cooling system 210 can provide cooling within aircraft 208 such as, for example, a cargo compartment in aircraft 208. Cooling system 210 can to provide cooling to the cargo compartment in aircraft 208 to items in the cargo compartment. As depicted, vapor cycle machine 212 is a cooling source for cooling system 210. Vapor cycle machine 212 includes a set of compressors 214. In this illustrative example, the set of compressors 214 can be implemented using at least one of a scroll compressor, a rotary compressor, a screw compressor, a reciprocating compressor, a centrifugal compressor, or some other suitable type of compressor.

In this illustrative example, system manager 202 can manage vapor cycle machine 212. For example, system manager 202 can predict when maintenance is needed for vapor cycle machine 212. For example, system manager 202 can determine when the set of compressors 214 operates in a manner that causes vapor cycle machine 212 to no longer function at a desired level of performance. This prediction can be made before vapor cycle machine 212 no longer operates as desired or per the specification for vapor cycle machine 212.

In the illustrative example, system manager 202 receives data 216 for vapor cycle machine 212 in aircraft 208. In this illustrative example, system manager 202 processes data that has been downloaded from aircraft 208. In other illustrative examples, system manager 202 can be located in a computer system in aircraft 208 and process data 216 onboard in aircraft 208.

As depicted, data 216 comprises pressure 218, temperature 220, and speed 222 for the set of compressors 214 in vapor cycle machine 212. In the illustrative example, pressure 218 is the outlet pressure for the set of compressors 214. For example, pressure 218 can be a discharge pressure downstream from the set of compressors 214. Temperature 220 can be the discharge temperature for a refrigerant fluid leaving the set of compressors 214. For example, temperature 220 is a liquid temperature for a refrigerant fluid exiting or leaving the set of compressors 214.

Speed 222 is the speed of a compressor in the set of compressors 214. In illustrative example, typically only a single compressor runs during the flight of aircraft 208. In some illustrative examples, the flight can begin with one compressor running and switch to another compressor in the set of compressors 214 during the flight. In yet other illustrative examples, a single compressor can switch to run with two compressors in the set of compressors 214. Similar permutations can be present when more than two compressors are present in the set of compressors 214. For example, the flight may begin with a single compressor and switch to running three or more compressors in the set of compressors 214 during the flight.

Data 216 can be received in airplane condition monitoring system (ACMS) data that is currently generated and received by currently available airplane condition monitoring systems used in aircraft 208.

System manager 202 can determine ratio 224 of pressure 218 to temperature 220 for the set of compressors 214 that ran during a flight of aircraft 208. Ratio 224 can be used to determine when nonconformance mode 226 is present for vapor cycle machine 212. In the illustrative example, nonconformance mode 226 is present when the performance of vapor cycle machine 212 begins to degrade in a manner that indicates that a clog is present in vapor cycle machine 212. In this illustrative example, the clog is a clogged filter in vapor cycle machine 212.

In this illustrative example, a compressor is considered to have run during a flight when the speed measured in revolutions per minute exceeds some threshold level. For example, a compressor in the set of compressors 214 can be considered to run during a flight when the speed of the compressor is equal to or greater than 1,500 revolutions per minute during the flight. The speed can be selected based on a threshold of at least one of when a compressor has failed or is turned off. The compressor may have some revolutions per minute based on fluid flow through the compressor.

In other illustrative examples, other speeds can be used to determine when the compressor has run during a flight. In the illustrative example, when the speed of the compressor is below the threshold selected, it is assumed that ratio 224 of pressure 218 to temperature 220 will not be satisfied.

For example, nonconformance mode 226 can be present when ratio 224 of pressure 218 to temperature 220 for the set of compressors 214 that ran during a flight of aircraft 208 exceeds threshold 228 more than selected number of times 230 over range of flights 232 for aircraft 208.

In this illustrative example, data 216 can be stored in historical flight data 234 for aircraft 208. Historical flight data 234 can comprise pressure 218, temperature 220, and speed 222 from prior flights.

In response to nonconformance mode 226 being present, system manager 202 can perform a set of actions 236. The set of actions 236 can include, for example, generating an alert, sending a message, scheduling maintenance, or some other suitable action.

Further, system manager 202 can perform a set of actions 236 based on predicting when maintenance is needed. Thus, system manager 202 can operate to detect when the operation of vapor cycle machine 212 is degrading in a manner that will require maintenance. The maintenance may include unclogging a filter, replacing the filter, replacing vapor cycle machine 212, or other suitable actions.

In the illustrative example, threshold 228, selected number of times 230, and range of flights 232 are values selected to determine when the performance of vapor cycle machine 212 is degrading. For example, selected number of times 230 can be based on when a clog has occurred in a filter in vapor cycle machine 212. In the illustrative example, threshold 228 for ratio 224 can be based on the number of compressors 214 that ran during a flight.

These parameters can be selected to determine when amount of life 238 is left in vapor cycle machine 212 before vapor cycle machine 212 no longer functions as needed to provide desirable cooling. Amount of life 238 can be selected by determining values for threshold 228, selected number of times 230, and range of flights 232. Amount of life 238 can be based on factors such as maintenance schedules, flight schedules, needed availability, vapor cycle machine part availability, and other factors that can affect how much time is needed to schedule and perform maintenance.

In this illustrative example, at least one of threshold 228, selected number of times 230, range of flights 232, or amount of life 238 can be determined using artificial intelligence system 240.

Artificial intelligence system 240 is a system that has intelligent behavior and can be based on function of a human brain. An artificial intelligence system comprises at least one of an artificial neural network, a cognitive system, a Bayesian network, a fuzzy logic, an expert system, a natural language system, or some other suitable system. Machine learning is used to train the artificial intelligence system. Machine learning involves inputting data into the process and allowing the process to adjust and improve the function of artificial intelligence system 240.

Artificial intelligence system 240 can be trained using historical data to determine values that indicate when a clog has occurred and to determine values that indicate when the clog in the filter is great enough that the compressor cannot operate for normal operation.

As depicted, artificial intelligence system 240 can determine threshold 228 for ratio 224 by comparing vapor cycle machines with unclogged filters with nonconforming vapor cycle machines with clogged filters to determine ratio 224 of pressure 218 to temperature 220 that indicates when a clogged filter is present in a vapor cycle machine.

In one example, threshold 228 for ratio 224 is 1.5 when the number of compressors that ran is one compressor. Threshold 228 for ratio 224 is 3.0 when the number of compressors 214 that ran is two compressors. In other illustrative examples, ratio 224 can be different when other numbers of compressors are present and used. For example, if a third compressor is present in the set of compressors 214, ratio 224 for when three compressors have run during a flight can be yet another value, such as 3.2.

The system manager 202 can use artificial intelligence system 240 to determine values for parameters selected from at least one of threshold 228, selected number of times 230, and range of flights 232 for amount of life 238. The values for these parameters can vary depending on the amount of advanced notice prior to failure of vapor cycle machine 212 is desired. The amount of advanced notice may depend on factors selected from at least one of routes of aircraft 208, maintenance locations, availability of replacement parts, desired availability of aircraft 208, or other suitable factors that enable operating aircraft 208 with a reduced amount of unavailability or in a manner to reduce maintenance costs. Further, the values for these parameters can also be selected to reduce the number of false positives.

In one illustrative example, one or more technical solutions are present that overcome a technical problem with maintaining vapor cycle machines. Vapor cycle machines can include at least one of a cargo refrigeration unit, a gallery chiller, a refrigeration unit, a cabin air cooling machine, a heat pump, a supplemental cooling unit, or other suitable types of systems in aircraft 208. As a result, one or more technical solutions can provide a technical effect of enabling scheduling of maintenance for a vapor cycle machine in a manner that provides for at least one of a reduced maintenance cost, a reduced repair cost, an increased availability of aircraft, a reduced loss of cargo due to failure of a vapor cycle machine, or an increased availability of aircraft.

Computer system 204 can be configured to perform at least one of the steps, operations, or actions described in the different illustrative examples using software, hardware, firmware or a combination thereof. As a result, computer system 204 operates as a special purpose computer system in which system manager 202 in computer system 204 enables managing vapor cycle machines in a manner that reduces undesired effects from values of vapor cycle machines. In particular, system manager 202 transforms computer system 204 into a special purpose computer system as compared to currently available general computer systems that do not have system manager 202. In the illustrative example, the use of system manager 202 in computer system 204 integrates processes into a practical application for managing a vapor cycle machine that increases the performance of a computer system to determine when maintenance is needed for a vapor cycle machine. In this practical application, data 216, including pressure 218, temperature 220, and speed 222 for a vapor cycle machine is received. This data can be analyzed to perform an action when a determination is made that the vapor cycle machine is degraded to nonconformance mode 226.

The illustration of aircraft management environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, data 216 can also include an identification of compressors from which each piece of speed data in speed 222 was detected. In this manner, speed 222 can be used to determine whether a particular compressor in the set of compressors 214 ran during the flight of aircraft 208. This identification of the compressor can be stored in historical flight data 234 for use in determining that the ratios over range of flights 232 exceeded threshold 228 selected number of times 230 over range of flights 232.

As another example, system manager 202 can be implemented to manage a vehicle other than aircraft 208. The vehicle can be selected from a group comprising a surface ship, a cargo ship, a submarine, a tank, a personnel carrier, a train, a refrigerated truck, a spacecraft, a bus, and other suitable vehicles. In yet another example, artificial intelligence system 240 can be implemented as a component within system manager 202.

When system manager 202 operates to manage vapor cycle machine 212 in a vehicle that may take other forms in addition to or in place of aircraft 208, system manager 202 operates to receive data 216 for vapor cycle machine 212 including pressure 218, temperature 220, and speed 222 for a set of compressors 214 in vapor cycle machine 212 in the vehicle; determine which of the set of compressors 214 ran during a last use of the vehicle; determine ratio 224 of pressure 218 to temperature 220 for the set of compressors 214 that ran during the last use of the vehicle; and perform a set of actions 236 when ratio 224 of pressure 218 to temperature 220 for the set of compressors 214 that ran during the last use of the vehicle exceeds threshold 228 more than selected number of times 230 over a range of uses for the vehicle.

As yet another illustrative example, system manager 202 can operate to manage one or more aircraft in addition to or in place of aircraft 208. System manager 202 can be located in an airline and manage vapor cycle machines for fleets of aircraft operated by the airline. As another example, system manager 202 can be located in a maintenance facility for a maintenance company providing services to various airlines. System manager 202 can then manage maintenance for fleets of aircraft for the different airlines.

Figure 3:
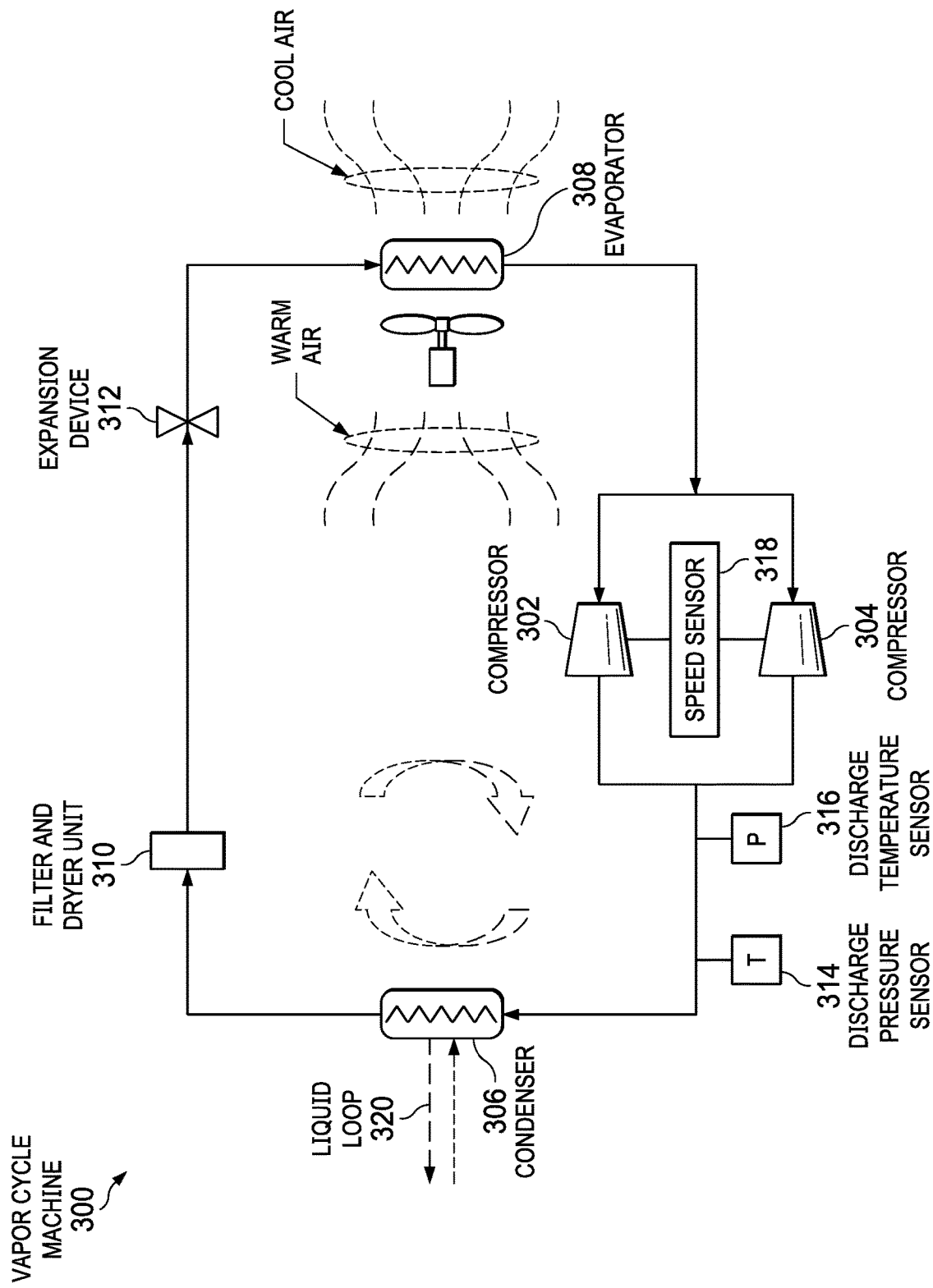
FIG. 3 is an illustration of a diagram of a cargo vapor cycle machine in accordance with an illustrative embodiment.

With reference now to FIG. 3, an illustration of a diagram of a vapor cycle machine is depicted in accordance with an illustrative embodiment. In this illustrative example, vapor cycle machine 300 is an example of one implementation for vapor cycle machine 212 shown in block form in FIG. 2. Vapor cycle machine 300 can be used in an aircraft to provide cooling in a cargo compartment within the aircraft.

In this depicted example, vapor cycle machine 300 comprises a number of different components. As depicted, vapor cycle machine 300 includes compressor 302, compressor 304, condenser 306, evaporator 308, filter and dryer unit 310, expansion device 312, discharge pressure sensor 314, discharge temperature sensor 316, and speed sensor 318.

In this illustrative example, at least one of compressor 302 or compressor 304 operates to force a refrigerant gas to pass through condenser 306. Condenser 306 operates to condense the refrigerant gas cooling. Heat can be drawn from condenser 306 through liquid loop 320.

As depicted, evaporator 308 provides cooling. This cooling can be for the air within a cargo compartment. In this manner, various items in the cargo compartment can be cooled. For example, these items can include at least one of live animals, food, perishables, pharmaceuticals, or other items needing refrigeration.

In this illustrative example, filter and dryer unit 310 is the component that can become clogged during the operation of vapor cycle machine 300. In particular, filter and dryer unit 310 can become clogged, thus reducing the ability of vapor cycle machine 300 to provide desirable cooling.

Expansion device 312 produces cooling energy by expanding the refrigerant passing through expansion device 312. Expansion device 312 can take a number of different forms. For example, expansion device 312 can be a valve, an orifice, or some other device that causes the refrigerant to expand.

As depicted, pressure can be detected by discharge pressure sensor 314. The pressure detected by the sensor is an example of pressure 218 in FIG. 2. In this illustrative example, discharge pressure sensor 314 is located between the compressors, compressor 302 and compressor 304, and condenser 306.

Discharge temperature sensor 316 is in a similar location as discharge pressure sensor 314. Discharge temperature sensor 316 detects the temperature of a refrigerant fluid downstream of compressor 302 and compressor 304. This temperature is an example of temperature 220 in FIG. 2. In some illustrative examples, discharge pressure sensor 314 and discharge temperature sensor 316 can be combined into a single unit.

As depicted, speed sensor 318 can detect speed of compressor 302 and compressor 304. Speed sensor 318 can generate speed data in the form of revolutions per minute (RPM). In this illustrative example, speed sensor 318 can be multiple speed detection units wherein each speed detection unit is integrated into compressor 302 and compressor 304.

The illustration of vapor cycle machine 300 is provided as an illustration of a manner in which vapor cycle machine 212 can be implemented and can be managed by system manager 202 in FIG. 2 and not meant to limit the manner in which a supplemental cooling unit can be implemented in an aircraft for management by system manager 202 in FIG. 2.

Further, vapor cycle machine 300 can include other components that are not shown. These other components are not shown for purposes of not obscuring a description of the illustrative example. For example, vapor cycle machine 300 can include a temperature fuse, charge ports for the compressor, and a flash tank. Vapor cycle machine 300 can also include additional valves or sensors.

Figure 4:
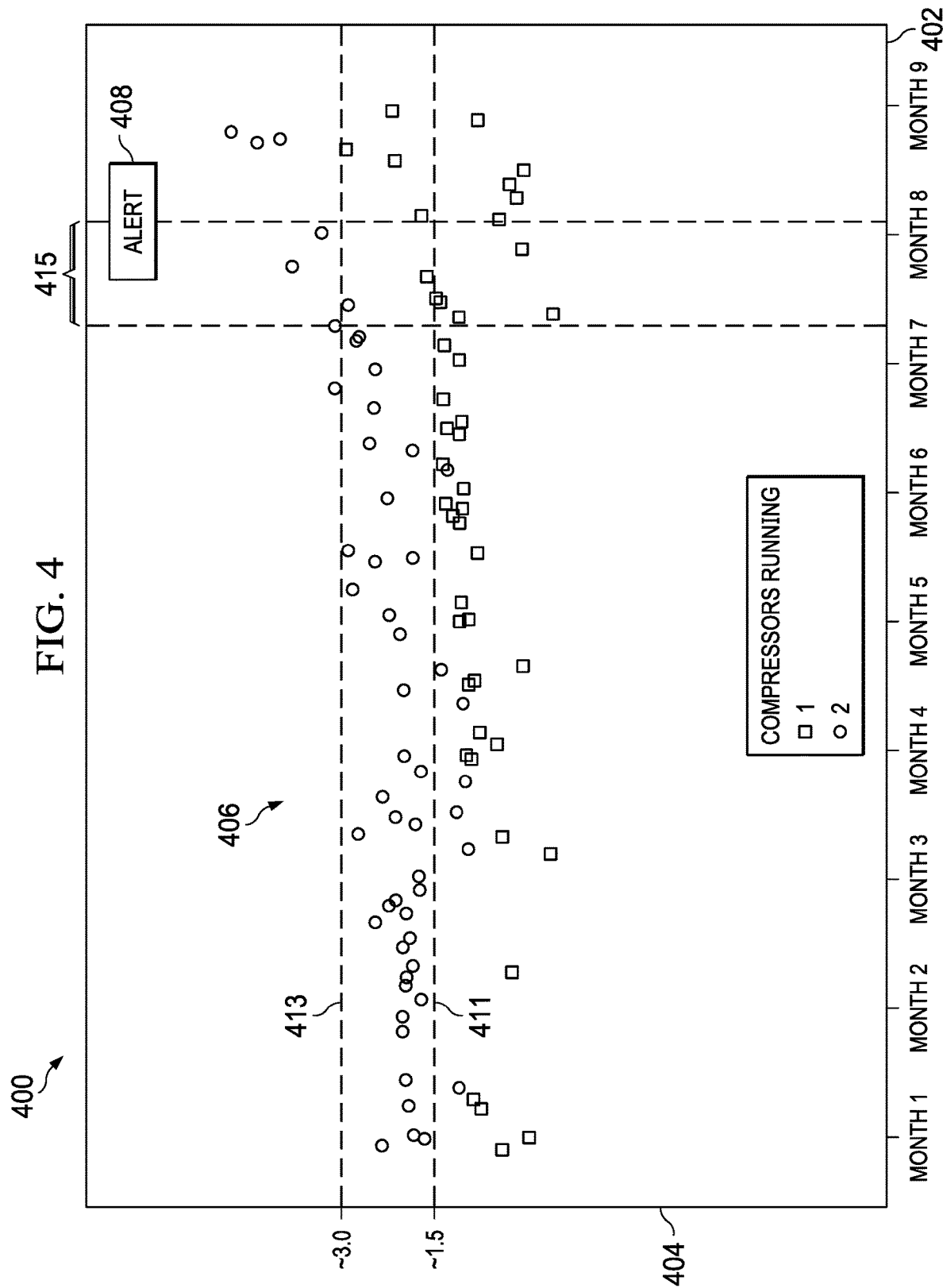
FIG. 4 is an illustration of a graph of data received from an aircraft for a vapor cycle machine in accordance with an illustrative embodiment.

In FIG. 4, an illustration of a graph of data received from an aircraft for a vapor cycle machine is depicted in accordance with an illustrative embodiment. In this illustrative example, in graph 400, x-axis 402 represents time intervals and y-axis 404 represents ratio values in which the ratio is for pressure to temperature. Points 406 in graph 400 represent ratios of pressure to temperature for a vapor cycle machine in an aircraft. The data includes ratios calculated for when one compressor ran during a flight and when two compressors ran during a flight.

As depicted, alert 408 is generated when a ratio of pressure to temperature exceeds a threshold more than a selected number of times over a range of flights for the aircraft. For example, the threshold for the ratio can be 1.5, as shown by line 411 for one compressor, and 3.0, as shown by line 413 for two compressors. The number of times can be three times and the range of flights can be the flights within section 415.

Figure 5:
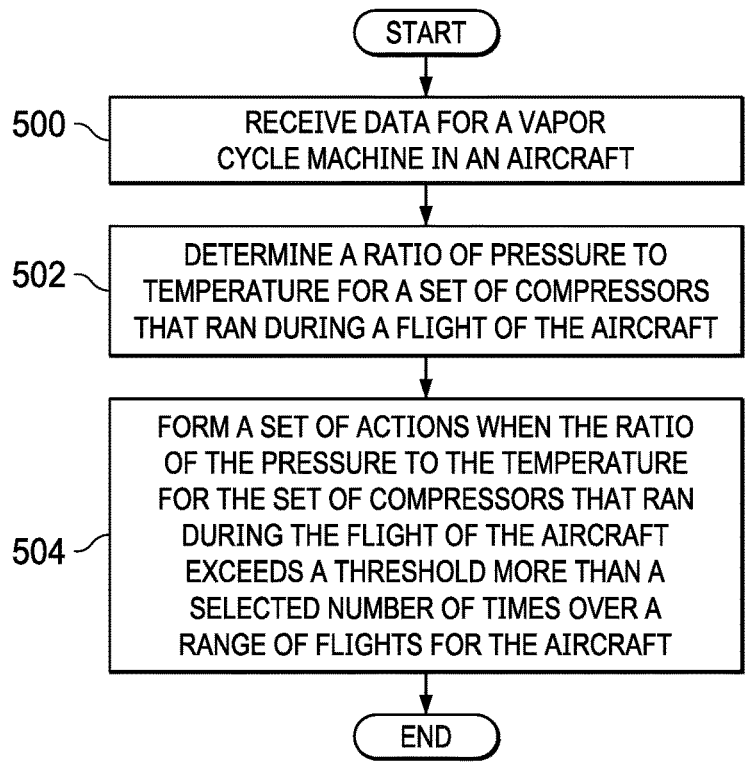
FIG. 5 is an illustration of a flowchart of a process for managing a vapor cycle machine in accordance with an illustrative embodiment.

Turning next to FIG. 5, an illustration of a flowchart of a process for managing a vapor cycle machine is depicted in accordance with an illustrative embodiment. The process in FIG. 5 can be implemented in hardware, software, or both. When implemented in software, the process can take the form of program code that is run by one or more processor units located in one or more hardware devices in one or more computer systems. For example, the process can be implemented in system manager 202 in computer system 204 in FIG. 2.

The process begins by receiving data for a vapor cycle machine in an aircraft (operation 500). In operation 500, the data comprises a pressure, a temperature, and a speed for a set of compressors in the vapor cycle machine. This data can be obtained from an airplane condition monitoring system that generates airplane condition monitoring data.

The process determines a ratio of pressure to temperature for a set of compressors that ran during a flight of the aircraft (operation 502). The ratio can be used to determine when the vapor cycle machine is in a degrading state.

The process forms a set of actions when the ratio of the pressure to the temperature for the set of compressors that ran during the flight of the aircraft exceeds a threshold more than a selected number of times over a range of flights for the aircraft (operation 504). The process terminates thereafter.

The set of actions can comprise at least one of generating an alert, sending a message, scheduling maintenance, or other suitable actions. In the illustrative example, the maintenance can be replacement of the vapor cycle machine, replacing a filter, or other suitable actions.

Figure 6:
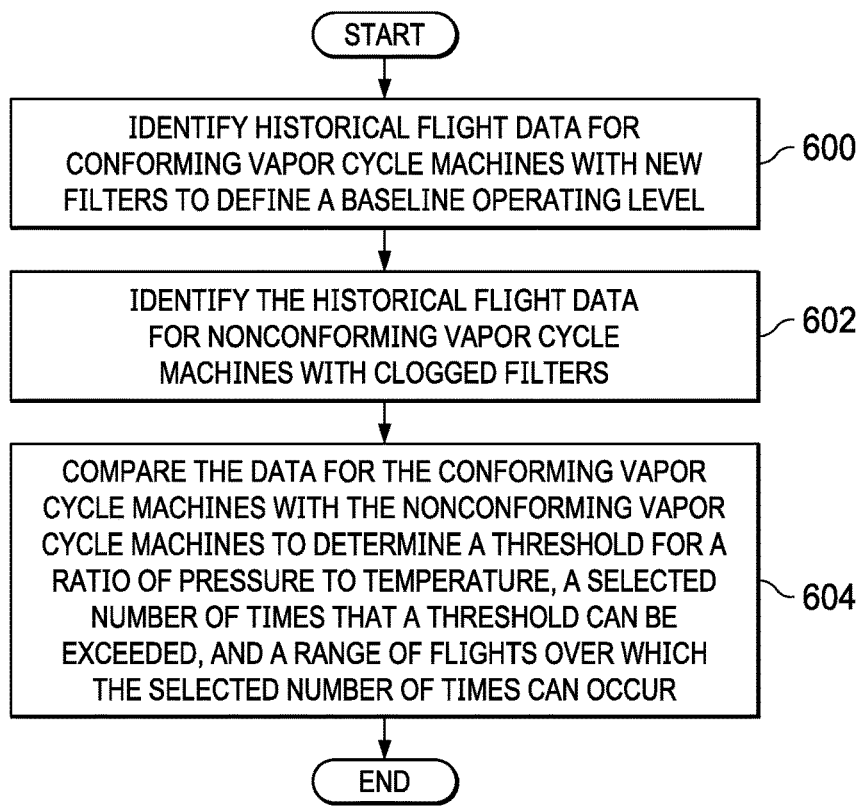
FIG. 6 is an illustration of a flowchart of a process for determining values for parameters used to predict when maintenance is needed for a vapor cycle machine in accordance with an illustrative embodiment.

Turning next to FIG. 6, an illustration of a flowchart of a process for determining values for parameters used to predict when maintenance is needed for a vapor cycle machine is depicted in accordance with an illustrative embodiment. The process in FIG. 6 can be implemented in hardware, software, or both. When implemented in software, the process can take the form of program code that is run by one or more processor units located in one or more hardware devices in one or more computer systems. For example, the process can be implemented in system manager 202 in computer system 204 in FIG. 2. The process can be implemented with system manager 202 including or using artificial intelligence system 240 in FIG. 2.

The process begins by identifying historical flight data for conforming vapor cycle machines with new filters to define a baseline operating level (operation 600). In other words, this date identified from the historical flight data is a baseline operating level for comparison. The process identifies the historical flight data for nonconforming vapor cycle machines with clogged filters (operation 602). The process compares the data for the conforming vapor cycle machines with the nonconforming vapor cycle machines to determine a threshold for a ratio of pressure to temperature, a selected number of times that a threshold can be exceeded, and a range of flights over which the selected number of times can occur (operation 604). The process terminates thereafter. The values for these parameters can be used to analyze data from an aircraft to determine whether a vapor cycle machine in the aircraft needs maintenance.

Figure 7:
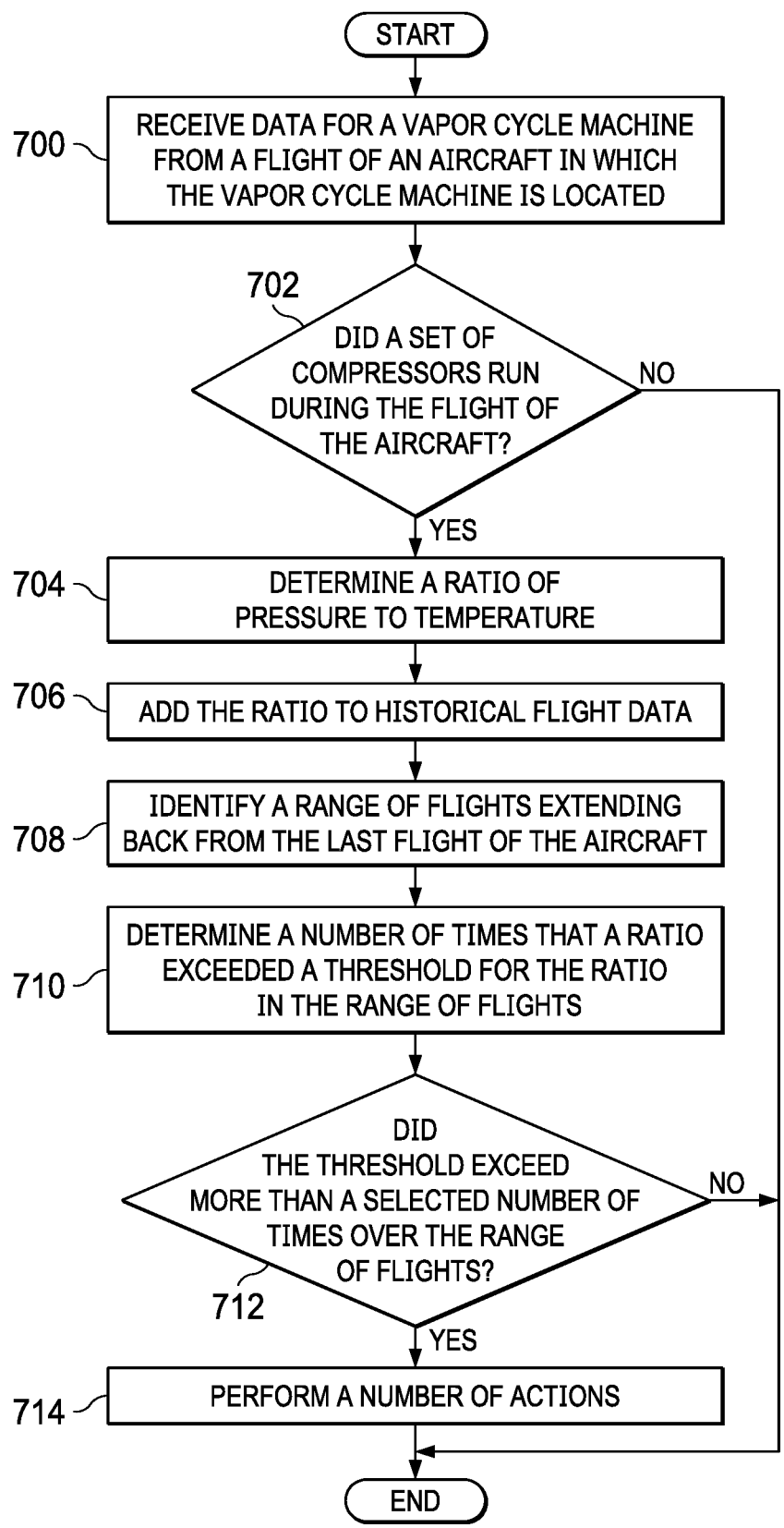
FIG. 7 is a more detailed illustration of a flowchart of a process for managing a vapor cycle machine in accordance with an illustrative embodiment.

Turning next to FIG. 7, a more detailed illustration of a flowchart of a process for managing a vapor cycle machine is depicted in accordance with an illustrative embodiment. The process in FIG. 7 can be implemented in hardware, software, or both. When implemented in software, the process can take the form of program code that is run by one or more processor units located in one or more hardware devices in one or more computer systems. For example, the process can be implemented in system manager 202 in computer system 204 in FIG. 2.

The process begins by receiving data for a vapor cycle machine from a flight of an aircraft in which the vapor cycle machine is located (operation 700). In operation 700, the data comprises a pressure, a temperature, and a speed for a set of compressors in the vapor cycle machine. This data can be obtained from an airplane condition monitoring system that generates airplane condition monitoring data.

The process determines whether a set of compressors ran during the flight of the aircraft (operation 700). In one illustrative example, a compressor can be assumed to run when the compressor speed is greater than equal to 1,500 revolutions per minute in this example. If the set of compressors ran during the flight, a ratio of pressure to temperature is determined (operation 702).

The process identifies historical plan data for the aircraft (operation 704). The process adds the ratio to historical flight data (operation 706).

The process identifies a range of flights extending back from a last flight of the aircraft (operation 708). The range of flights can be, for example, 10 flights. Of course, other ranges of flights can be used such as three flights, 30 flights, or some other number of flights.

The process determines a number of times that a ratio exceeded a threshold for the ratio in the range of flights (operation 710). For example, a flight of the aircraft is counted when the ratio exceeds 1.5 when one compressor ran during a flight and when the ratio exceeds 3.0 when two compressors ran during a flight in the range of flights.

The process determines whether the threshold was exceeded more than a selected number of times over the range of flights (operation 712). If the threshold was exceeded more than the selected number of times over the range of flights, the process performs a number of actions (operation 714). The process terminates thereafter.

With reference again to operation 700, if the set of compressors did not run, the process terminates. The process also terminates from operation 710 if the ratio did not exceed the threshold for a selected number of times during the range of flights.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, the processes in the different flowcharts can be applied to manage vapor cycle machines in vehicles other than aircraft. The data can be collected for each use of a vehicle. The use can be, for example, when the vehicle operates to travel from a source location to a destination location. With the vehicle such as a semi-trailer tractor or a train, data can be analyzed for each use of the vehicle in a manner similar to analyzing data for each flight of an aircraft.

Figure 8:
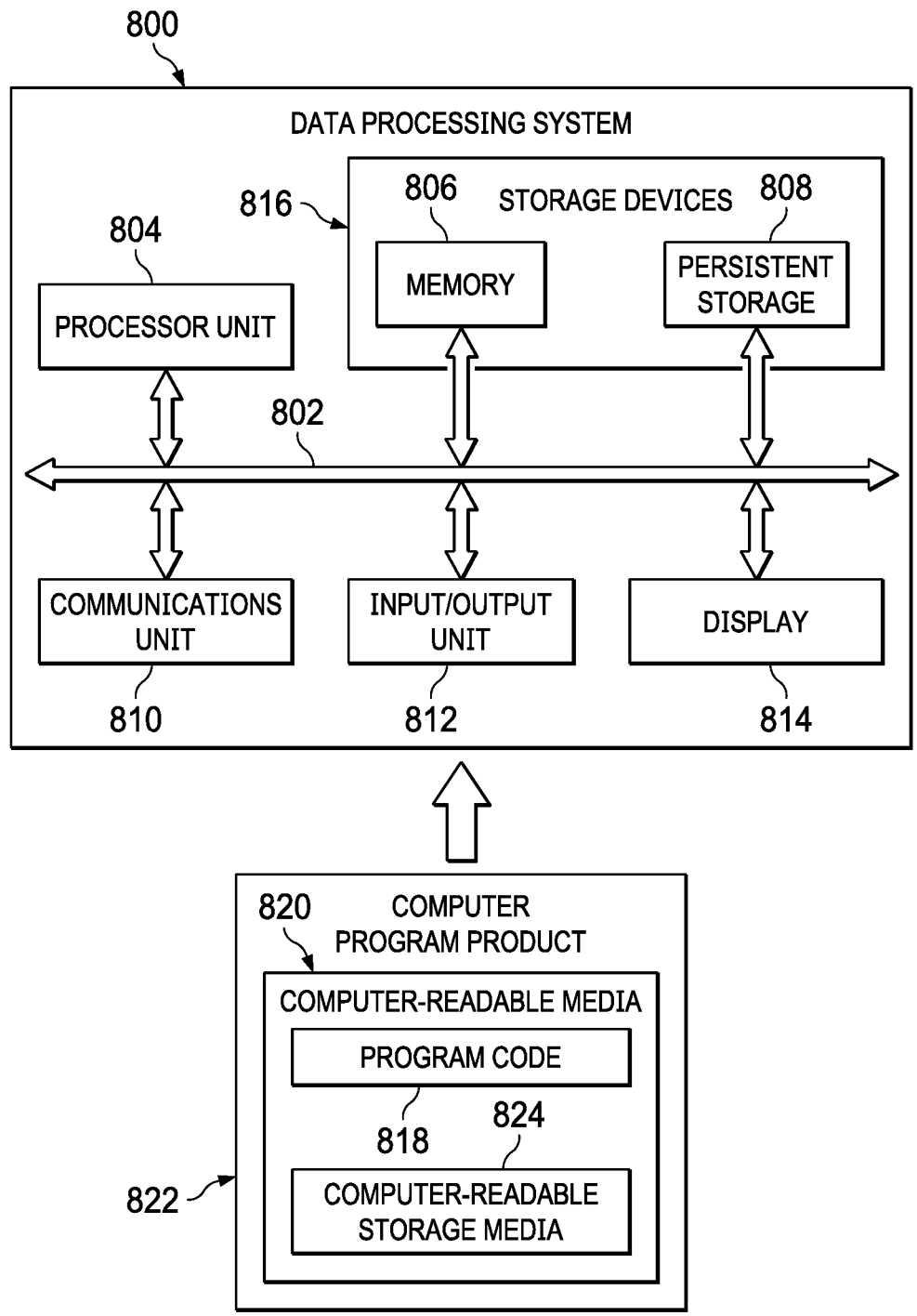
FIG. 8 is an illustration of a block diagram of a data processing system in accordance with an illustrative embodiment.

Turning now to FIG. 8, an illustration of a block diagram of a data processing system is depicted in accordance with an illustrative embodiment. Data processing system 800 can be used to implement server computer 104, server computer 106, and client devices 110, in FIG. 1. Data processing system 800 can also be used to implement computer system 204. In this illustrative example, data processing system 800 includes communications framework 802, which provides communications between processor unit 804, memory 806, persistent storage 808, communications unit 810, input/output (I/O) unit 812, and display 814. In this example, communications framework 802 takes the form of a bus system.

Processor unit 804 serves to execute instructions for software that can be loaded into memory 806. Processor unit 804 includes one or more processors. For example, processor unit 804 can be selected from at least one of a multicore processor, a central processing unit (CPU), a graphics processing unit (GPU), a physics processing unit (PPU), a digital signal processor (DSP), a network processor, or some other suitable type of processor.

Memory 806 and persistent storage 808 are examples of storage devices 816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 816 may also be referred to as computer-readable storage devices in these illustrative examples. Memory 806, in these examples, can be, for example, a random-access memory or any other suitable volatile or non-volatile storage device. Persistent storage 808 can take various forms, depending on the particular implementation.

For example, persistent storage 808 may contain one or more components or devices. For example, persistent storage 808 can be a hard drive, a solid-state drive (SSD), a flash memory, a rewritable optical disk, a rewritable magnetic tape, or some combination of the above. The media used by persistent storage 808 also can be removable. For example, a removable hard drive can be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that can be connected to data processing system 800. For example, input/output unit 812 can provide a connection for user input through at least one of a keyboard, a mouse, or some other suitable input device. Further, input/output unit 812 can send output to a printer. Display 814 provides a mechanism to display information to a user.

Instructions for at least one of the operating system, applications, or programs can be located in storage devices 816, which are in communication with processor unit 804 through communications framework 802. The processes of the different embodiments can be performed by processor unit 804 using computer-implemented instructions, which can be located in a memory, such as memory 806.

These instructions are referred to as program code, computer usable program code, or computer-readable program code that can be read and executed by a processor in processor unit 804. The program code in the different embodiments can be embodied on different physical or computer-readable storage medium, such as memory 806 or persistent storage 808.

Program code 818 is located in a functional form on computer-readable medium 820 that is selectively removable and can be loaded onto or transferred to data processing system 800 for execution by processor unit 804. Program code 818 and computer-readable medium 820 form computer program product 822 in these illustrative examples. In the illustrative example, computer-readable medium 820 is computer-readable storage medium 824.

In these illustrative examples, computer-readable storage medium 824 is a physical or tangible storage device used to store program code 818 rather than a medium that propagates or transmits program code 818. Computer readable storage medium 820, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 818 can be transferred to data processing system 800 using a computer-readable signal media. The computer-readable signal media can be, for example, a propagated data signal containing program code 818. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 820" can be singular or plural. For example, program code 818 can be located in computer-readable media 820 in the form of a single storage device or system. In another example, program code 818 can be located in computer-readable media 820 that is distributed in multiple data processing systems. In other words, some instructions in program code 818 can be located in one data processing system while other instructions in in program code 818 can be located in one data processing system. For example, a portion of program code 818 can be located in computer-readable media 820 in a server computer while another portion of program code 818 can be located in computer-readable media 820 located in a set of client computers.

The different components illustrated for data processing system 800 are not meant to provide architectural limitations to the manner in which different embodiments can be implemented. In some illustrative examples, one or more of the components may be incorporated in or otherwise form a portion of, another component. For example, memory 806, or portions thereof, can be incorporated in processor unit 804 in some illustrative examples. The different illustrative embodiments can be implemented in a data processing system including components in addition to or in place of those illustrated for data processing system 800. Other components shown in FIG. 8 can be varied from the illustrative examples shown. The different embodiments can be implemented using any hardware device or system capable of running program code 818.

Figure 9:
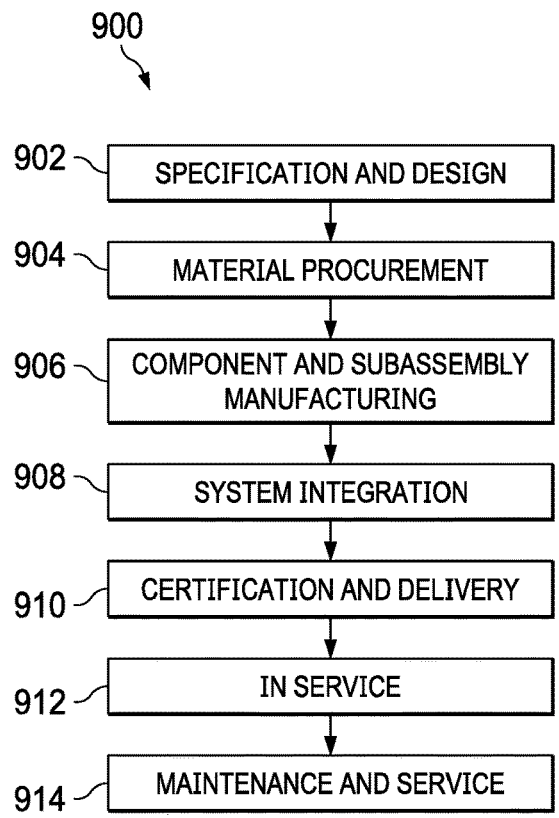
FIG. 9 is an illustration of an aircraft manufacturing and service method in accordance with an illustrative embodiment.
Figure 10:
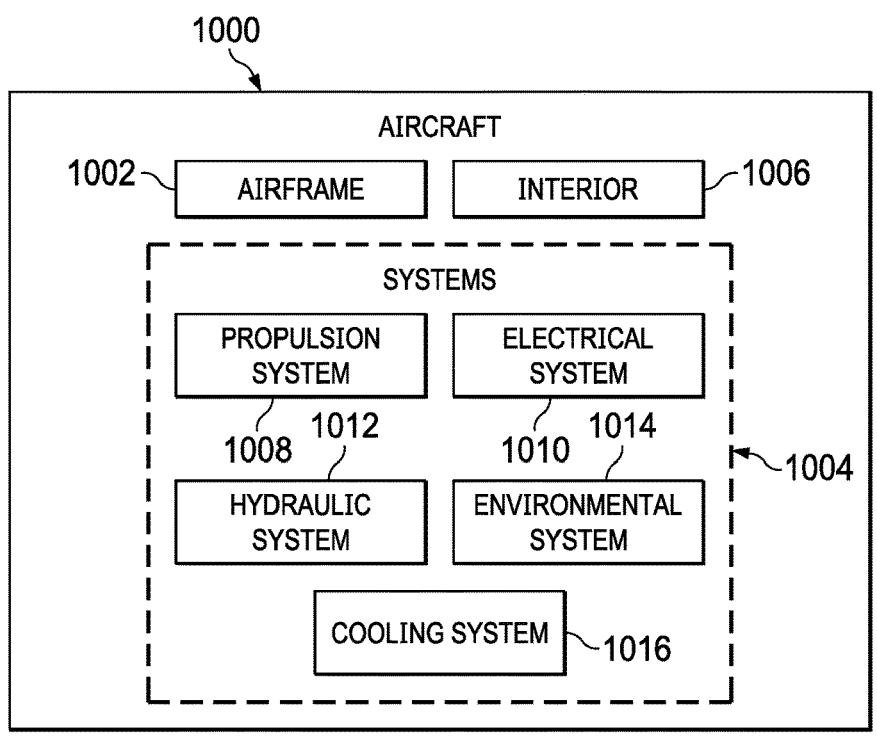
FIG. 10 is an illustration of a block diagram of an aircraft in which an illustrative embodiment may be implemented.

Illustrative embodiments of the disclosure may be described in the context of aircraft manufacturing and service method 900 as shown in FIG. 9 and aircraft 1000 as shown in FIG. 10. Turning first to FIG. 9, an illustration of an aircraft manufacturing and service method is depicted in accordance with an illustrative embodiment. During pre-production, aircraft manufacturing and service method 900 may include specification and design 902 of aircraft 1000 in FIG. 10 and material procurement 904.

During production, component and subassembly manufacturing 906 and system integration 908 of aircraft 1000 in FIG. 10 takes place. Thereafter, aircraft 1000 in FIG. 10 can go through certification and delivery 910 in order to be placed in service 912. While in service 912 by a customer, aircraft 1000 in FIG. 10 is scheduled for routine maintenance and service 914, which may include modification, reconfiguration, refurbishment, and other maintenance or service.

Each of the processes of aircraft manufacturing and service method 900 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 10, an illustration of an aircraft is depicted in which an illustrative embodiment may be implemented. In this example, aircraft 1000 is produced by aircraft manufacturing and service method 900 in FIG. 9 and may include airframe 1002 with plurality of systems 1004 and interior 1006. Examples of systems 1004 include one or more of propulsion system 1008, electrical system 1010, hydraulic system 1012, environmental system 1014, and cooling system 1016. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 900 in FIG. 9.

In one illustrative example, components or subassemblies produced in component and subassembly manufacturing 906 in FIG. 9 can be fabricated or manufactured in a manner similar to components or subassemblies produced while aircraft 1000 is in service 912 in FIG. 9. As yet another example, one or more apparatus embodiments, method embodiments, or a combination thereof can be utilized during production stages, such as component and subassembly manufacturing 906 and system integration 908 in FIG. 9. One or more apparatus embodiments, method embodiments, or a combination thereof may be utilized while aircraft 1000 is in service 912, during maintenance and service 914 in FIG. 9, or both. The use of a number of the different illustrative embodiments may substantially expedite the assembly of aircraft 1000, reduce the cost of aircraft 1000, or both expedite the assembly of aircraft 1000 and reduce the cost of aircraft 1000.

For example, system manager 202 can be used to predict when maintenance and service 914 will be needed for cooling system 1016 in aircraft 1000. The use of system manager 202 can be used to reduce maintenance costs in maintenance and service 914, increased availability of aircraft 1000 for in service 912, or some combination thereof.

Thus, illustrative examples provide a method, apparatus, system, the computer program product for managing a vapor cycle machine in a vehicle such as an aircraft.

In the illustrative examples, data is received for a vapor cycle machine in an aircraft. The data comprises a pressure, a temperature, and a speed for a set of compressors in the vapor cycle machine. A ratio of the pressure to the temperature is determined for the set of compressors that ran during a flight of the aircraft. A set of actions is performed when the ratio of the pressure to the temperature for the set of compressors that ran during the flight of the aircraft exceeds a threshold more than a selected number of times over a range of flights for the aircraft.

The illustrative examples enable scheduling of maintenance for a vapor cycle machine in a manner that provides at least one of a reduced maintenance cost, a reduced repair cost, an increased availability of aircraft, a reduced loss of cargo due to failure of a vapor cycle machine, or an increased availability of aircraft. As a result, the illustrative examples can reduce costs for operating aircraft.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing a vapor cycle machine, the method comprising:
   receiving, by a computer system of a vapor cycle machine management system, data for the vapor cycle machine in an aircraft, wherein the data comprises a pressure, a temperature, and a speed for a set of compressors in the vapor cycle machine;
   determining, by a system manager of the computer system, a ratio of the pressure to the temperature for the set of compressors that ran during a flight of the aircraft; and
   performing, by the system manager of the computer system, a set of actions when the ratio of the pressure to the temperature for the set of compressors that ran during the flight of the aircraft exceeds a threshold more than a selected number of times over a range of flights for the aircraft,
   wherein the threshold for the ratio is based on a number of compressors that ran during the flight.

2. The method of claim 1, wherein performing, by the computer system, the set of actions when the ratio of the pressure to the temperature for the set of compressors that ran during the flight of the aircraft exceeds the threshold more than the selected number of times over the range of flights for the aircraft comprises:
   scheduling, by the computer system, maintenance for the vapor cycle machine in the aircraft in response to the ratio of the pressure to the temperature for the set of compressors that ran during the flight of the aircraft exceeds the threshold more than the selected number of times over the range of flights for the aircraft.

3. The method of claim 1, wherein the data is received during at least one of after the flight of the aircraft or during the flight of the aircraft.

4. The method of claim 1, wherein the threshold and the selected number of times over the range of flights is based on when a clog has occurred in a filter in the vapor cycle machine.

5. The method of claim 1 further comprising:
   comparing, by the computer system, conforming vapor cycle machines with unclogged filters with nonconforming vapor cycle machines with clogged filters to determine the ratio of the pressure to the temperature that indicates when a clogged filter is present in the vapor cycle machine.

6. The method of claim 1, wherein the pressure is a discharge pressure downstream from the set of compressors and the temperature is a liquid temperature for a refrigerant fluid downstream from the set of compressors.

7. The method of claim 1, wherein the set of actions comprises at least one of generating an alert, sending a message, or scheduling maintenance.

8. The method of claim 1, wherein the data is airplane condition monitoring system data.

9. The method of claim 1, wherein the threshold for the ratio is 1.5 when the number of compressors that ran is one compressor and the threshold for the ratio is 3.0 when the number of compressors that ran is two compressors.

10. The method of claim 1, wherein the computer system is located in a least one of the aircraft or a ground location.

11. A method for managing a vapor cycle machine, the method comprising:
   receiving, by a computer system of a vapor cycle machine management system, data for the vapor cycle machine in an aircraft, wherein the data comprises a pressure, a temperature, and a speed for a set of compressors in the vapor cycle machine;
   determining, by a system manager of the computer system, a ratio of the pressure to the temperature for the set of compressors that ran during a flight of the aircraft and
   performing, by the system manager of the computer system, a set of actions when the ratio of the pressure to the temperature for the set of compressors that ran during the flight of the aircraft exceeds a threshold more than a selected number of times over a range of flights for the aircraft,
   wherein a compressor in the set of compressors runs during the flight when the speed of the compressor is equal to or greater than 1,500 revolutions per minute during the flight.

12. A vapor cycle machine management system comprising:
   a computer system; and a system manager in the computer system, wherein the system manager operates to:
receive data for a vapor cycle machine in an aircraft, wherein the data comprises a pressure, a temperature, and a speed for a set of compressors in the vapor cycle machine;
determine a ratio of the pressure to the temperature for the set of compressors that ran during a flight of the aircraft; and
perform a set of actions when the ratio of the pressure to the temperature for the set of compressors that ran during the flight of the aircraft exceeds a threshold more than a selected number of times over a range of flights for the aircraft,
wherein the threshold for the ratio is based on a number of compressors that ran during the flight.

13. The vapor cycle machine management system of claim 12 wherein in performing, by the computer system, the set of actions when the ratio of the pressure to the temperature for the set of compressors that ran during the flight of the aircraft exceeds the threshold more than the selected number of times over the range of flights for the aircraft, the system manager operates to:
schedule maintenance for the vapor cycle machine in the aircraft in response the ratio of the pressure to the temperature for the set of compressors that ran during the flight of the aircraft exceeds the threshold more than the selected number of times over the range of flights for the aircraft.

14. The vapor cycle machine management system of claim 12, wherein the data is received during at least one of after the flight of the aircraft or during the flight of the aircraft.

15. The vapor cycle machine management system of claim 12, wherein the threshold and the selected number of times over the range of flights is based on when a clog has occurred in a filter in the vapor cycle machine.

16. The vapor cycle machine management system of claim 12, wherein the system manager operates to:
compare conforming vapor cycle machines with unclogged filters with nonconforming vapor cycle machines with clogged filters to determine the ratio of the pressure to the temperature that indicates when a clogged filter is present in the vapor cycle machine.

17. The vapor cycle machine management system of claim 12, wherein the pressure is a discharge pressure downstream from the set of compressors and the temperature is a liquid temperature for a refrigerant fluid downstream from the set of compressors.

18. The vapor cycle machine management system of claim 12, wherein the set of actions comprises at least one of generating an alert, sending a message, or scheduling maintenance.

19. The vapor cycle machine management system of claim 12, wherein the data is airplane condition monitoring system data.

20. The vapor cycle machine management system of claim 12, wherein the threshold for the ratio is 1.5 when the number of compressors that ran is one compressor and the threshold for the ratio is 3.0 when the number of compressors that ran is two compressors.

21. A vapor cycle machine management system comprising:
a computer system; and
a system manager in the computer system, wherein the system manager operates to:
receive data for a vapor cycle machine in an aircraft, wherein the data comprises a pressure, a temperature, and a speed for a set of compressors in the vapor cycle machine;
determine a ratio of the pressure to the temperature for the set of compressors that ran during a flight of the aircraft; and
perform a set of actions when the ratio of the pressure to the temperature for the set of compressors that ran during the flight of the aircraft exceeds a threshold more than a selected number of times over a range of flights for the aircraft,
wherein a compressor in the set of compressors runs during the flight when the speed of the compressor is equal to or greater than 1,500 revolutions per minute during the flight.

22. A vapor cycle machine management system comprising:
a computer system; and
a system manager in the computer system, wherein the system manager operates to:
receive data for a vapor cycle machine including a pressure, a temperature, and a speed for a set of compressors in the vapor cycle machine in a vehicle;
determine which of the set of compressors ran during a last use of the vehicle;
determine a ratio of the pressure to the temperature for the set of compressors that ran during the last use of the vehicle; and
perform a set of actions when the ratio of the pressure to the temperature for the set of compressors that ran during the last use of the vehicle that exceeds a threshold more than a selected number of times over a range of uses for the vehicle,
wherein the threshold for the ratio is based on a number of compressors that ran during a flight.

23. The vapor cycle machine management system of claim 22 wherein in performing, by the computer system, the set of actions when the ratio of the pressure to the temperature for the set of compressors that ran during the last use of the vehicle exceeds the threshold more than the selected number of times over the range of uses of the vehicle, the system manager operates to:
schedule maintenance for the vapor cycle machine in the vehicle when the ratio of the pressure to the temperature for the set of compressors that ran during the last use of the vehicle exceeds the threshold more than the selected number of times over the range of uses of the vehicle.

24. The vapor cycle machine management system of claim 22, wherein the data is received during at least one of after the last use of the vehicle or during the last use of the vehicle.

25. The vapor cycle machine management system of claim 22, wherein the threshold and the selected number of times over the range of uses is based on when a clog has occurred in a filter in the vapor cycle machine.

26. The vapor cycle machine management system of claim 22, wherein the set of actions comprises at least one of generating an alert, sending a message, or scheduling maintenance.

27. The vapor cycle machine management system of claim 22, wherein the vehicle is selected from a group comprising an aircraft, a surface ship, a cargo ship, a submarine, a tank, a personnel carrier, a train, a spacecraft, and a bus.

28. The vapor cycle machine management system of claim 22, wherein the threshold for the ratio is 1.5 when the number of compressors that ran is one compressor and the threshold for the ratio is 3.0 when the number of compressors that ran is two compressors.

29. A vapor cycle machine management system comprising:
- a computer system; and
- a system manager in the computer system, wherein the system manager operates to:
  - receive data for a vapor cycle machine including a pressure, a temperature, and a speed for a set of compressors in the vapor cycle machine in a vehicle;
  - determine which of the set of compressors ran during a last use of the vehicle;
  - determine a ratio of the pressure to the temperature for the set of compressors that ran during the last use of the vehicle; and
  - perform a set of actions when the ratio of the pressure to the temperature for the set of compressors that ran during the last use of the vehicle that exceeds a threshold more than a selected number of times over a range of uses for the vehicle,
- wherein a compressor in the set of compressors runs during a flight when the speed of the compressor is equal to or greater than 1,500 revolutions per minute during the flight.

* * * * *